United States Patent
Del Gaizo et al.

(10) Patent No.: US 10,040,494 B2
(45) Date of Patent: Aug. 7, 2018

(54) AERODYNAMIC FLOOR PAN FOR A VEHICLE

(71) Applicant: GM GLOBAL TECHNOLOGY OPERATIONS LLC, Detroit, MI (US)

(72) Inventors: Steven A. Del Gaizo, Madison Heights, MI (US); Suzanne M. Cody-Gump, Macomb, MI (US); Brian S. Tipton, Troy, MI (US); Alexander N. Nastov, Warren, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 60 days.

(21) Appl. No.: 15/398,744

(22) Filed: Jan. 5, 2017

(65) Prior Publication Data

US 2018/0186412 A1 Jul. 5, 2018

(51) Int. Cl.
| | |
|---|---|
| *B60N 99/00* | (2006.01) |
| *B62D 35/02* | (2006.01) |
| *B62D 21/09* | (2006.01) |
| *B62D 25/24* | (2006.01) |
| *B62D 25/20* | (2006.01) |

(52) U.S. Cl.
CPC ............. *B62D 35/02* (2013.01); *B62D 21/09* (2013.01); *B62D 25/20* (2013.01); *B62D 25/24* (2013.01)

(58) Field of Classification Search
CPC ........ B62D 35/02; B62D 21/09; B62D 25/20; B62D 25/24
See application file for complete search history.

(56) References Cited

U.S. PATENT DOCUMENTS

| | | | | |
|---|---|---|---|---|
| 4,699,418 A | * | 10/1987 | Plavetich | B60N 2/206 296/65.09 |
| 4,932,709 A | * | 6/1990 | Wainwright | B60N 2/0292 296/65.09 |
| 5,044,683 A | * | 9/1991 | Parsson | B60N 2/3013 280/807 |
| 5,482,349 A | * | 1/1996 | Richter | B60N 2/2352 296/65.09 |
| 5,605,368 A | * | 2/1997 | Noma | B60N 2/06 248/430 |
| 5,658,046 A | * | 8/1997 | Rus | B60N 2/3013 16/4 |
| 6,089,641 A | * | 7/2000 | Mattarella | B60N 2/3011 296/64 |

(Continued)

*Primary Examiner* — Lori Lynn Lyjak
(74) *Attorney, Agent, or Firm* — Quinn IP Law (57) ABSTRACT

A floor pan includes a mid-body portion having a bottom wall. The bottom wall includes a forward end and a rearward end spaced from each other along a longitudinal axis. The mid-body portion of the floor pan is spaced above a reference plane, e.g., a ground surface, a first height at the forward end of the bottom wall, and is spaced above the reference plane a second height at the rearward end of the bottom wall. The second height is less than the first height to position the second end of the bottom wall nearer the reference plane than the first end of the bottom wall. The contoured shape of the mid-body portion provides an aerodynamic shield to direct airflow underneath components of the vehicle located rearward of the rearward end of the mid-body portion of the floor pan, as well as additional under-floor storage space.

17 Claims, 4 Drawing Sheets

(56) References Cited

U.S. PATENT DOCUMENTS

| | | | | |
|---|---|---|---|---|
| 6,270,141 B2* | 8/2001 | Moon | ............... | B60N 2/206 |
| | | | | 296/65.08 |
| 6,869,138 B2* | 3/2005 | Rhodes | ............... | B60N 2/062 |
| | | | | 296/65.09 |
| 7,077,451 B2* | 7/2006 | Rhodes | ............... | B60N 2/3013 |
| | | | | 296/65.01 |
| 8,894,124 B2* | 11/2014 | Thota | ............... | B60N 2/36 |
| | | | | 296/37.16 |
| 2011/0227385 A1* | 9/2011 | Holder | ............... | B60N 2/3013 |
| | | | | 297/337 |

* cited by examiner

AERODYNAMIC FLOOR PAN FOR A VEHICLE

INTRODUCTION

The disclosure generally relates to a floor pan of a vehicle.

A floor pan forms an underside of a body of a vehicle. The floor pan may be constructed from one or more stamped panels, beams, reinforcing members, etc. The floor pan at least partially forms the floor for a passenger compartment of the vehicle, as well as providing the structure to which other components of the vehicle may be attached to and/or supported by.

Airflow between a ground surface and the floor pan may be disrupted by the various components of the vehicle, such as the fuel tank, rear axle, suspension components, etc. The disruption in airflow generates turbulence, and may increase aerodynamic drag on the vehicle.

SUMMARY

A vehicle is provided. The vehicle includes a frame system, which extends along a longitudinal axis between a forward end and a rearward end. A floor pan is attached to the frame system. The floor pan includes a mid-body portion having a bottom wall. The bottom wall includes a first end and a second end spaced from each other along the longitudinal axis. The first end is disposed nearer the forward end of the frame system than the second end. The second end is disposed nearer the rearward end of the frame system than the first end. The mid-body portion of the floor pan is spaced above a reference plane a first height at the first end of the bottom wall, and is spaced above the reference plane a second height at the second end of the bottom wall. The second height is less than the first height to position the second end of the bottom wall nearer the reference plane than the first end of the bottom wall.

In one aspect of the vehicle, the mid-body portion includes a top edge, and defines a depth between the top edge and the bottom wall. The depth of the mid-body portion at the first end of the bottom wall presents the bottom wall at the first height relative to the reference plane. The depth of the mid-body portion at the second end of the bottom wall presents the bottom wall at the second height relative to the reference plane.

In another aspect of the vehicle, the depth of the mid-body portion changes gradually, between the first end and the second end of the bottom wall, with a change in position along the longitudinal axis. In yet another aspect of the vehicle, the depth of the mid-body portion adjacent the second end of the bottom wall is greater than the depth of the mid-body portion adjacent the first end of the bottom wall.

In another aspect of the vehicle, the mid-body portion of the floor pan forms a storage compartment between the top edge of the mid-body portion and the bottom wall of the mid-body portion, adjacent the second end of the bottom wall. In another aspect of the vehicle, the floor pan may include a cover that is operable to cover the storage compartment.

In one aspect of the vehicle, the mid-body portion of the floor pan at least partially provides a floor for a passenger compartment, and at least partially defines a lower exterior surface of the floor pan. In another aspect of the vehicle, the mid-body portion of the floor pan is operable to support a load applied to the floor pan from within a passenger compartment.

In another aspect of the vehicle, the mid-body portion of the floor pan is operable to direct a flow of air underneath a component of the vehicle that is disposed rearward of the mid-body portion of the floor pan, along the longitudinal axis.

In another aspect of the vehicle, the mid-body portion includes a first section that is generally disposed at the first height relative to the reference plane, and a second section that is generally disposed at the second height relative to the reference plane. The mid-body portion further includes a transition section that extends between the first section and the second section, and transitions the bottom wall of the mid-body portion between the first height and the second height relative to the reference plane.

A floor pan for a vehicle is also provided. The floor pan includes a mid-body portion having a top edge and a bottom wall. The bottom wall has a forward end and a rearward end spaced from each other along a longitudinal axis. The mid-body portion defines a depth between the top edge and the bottom wall. The depth at the forward end of the bottom wall has a first value, and the depth at the second end of the bottom wall has a second value. The second value of the depth is greater than the first value of the depth to position the rearward end of the bottom wall at a lower elevation than the forward end of the bottom wall relative to a reference plane.

In one aspect of the floor pan, the depth of the mid-body portion changes gradually, between the forward end and the rearward end of the bottom wall, with a change in position along the longitudinal axis.

In another aspect of the floor pan, the mid-body portion of the floor pan forms a storage compartment between the top edge of the mid-body portion, and the bottom wall of the mid-body portion. The storage compartment is disposed adjacent the rearward end of the bottom wall. The floor pan may include a cover that is operable to cover the storage compartment.

In another aspect of the floor pan, the mid-body portion at least partially defines a lower exterior surface of the floor pan.

In another aspect of the floor pan, the mid-body portion includes a first section generally disposed at the first value of the depth, and a second section generally disposed at the second value of the depth. The mid-body portion further includes a transition section extending between the first section and the second section, and transitioning the bottom wall of the mid-body portion between the first value of the depth and the second value of the depth.

Accordingly, the mid-body portion of the floor pan is contoured so that the rearward end of the mid-body portion is disposed nearer the ground surface than the forward end of the mid-body portion, thereby directing airflow underneath components of the vehicle disposed rearward of the rearward end of the mid-body portion and reducing turbulence in the airflow. Aerodynamic drag on the vehicle is decreased by directing airflow underneath the rearward components of the vehicle.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims.

Referring to the FIGS., wherein like numerals indicate like parts throughout the several views, a vehicle is generally shown at 20. The vehicle 20 may include any moveable platform, such as but not limited to a car, a truck, an SUV, a train, etc.

Figure 1:
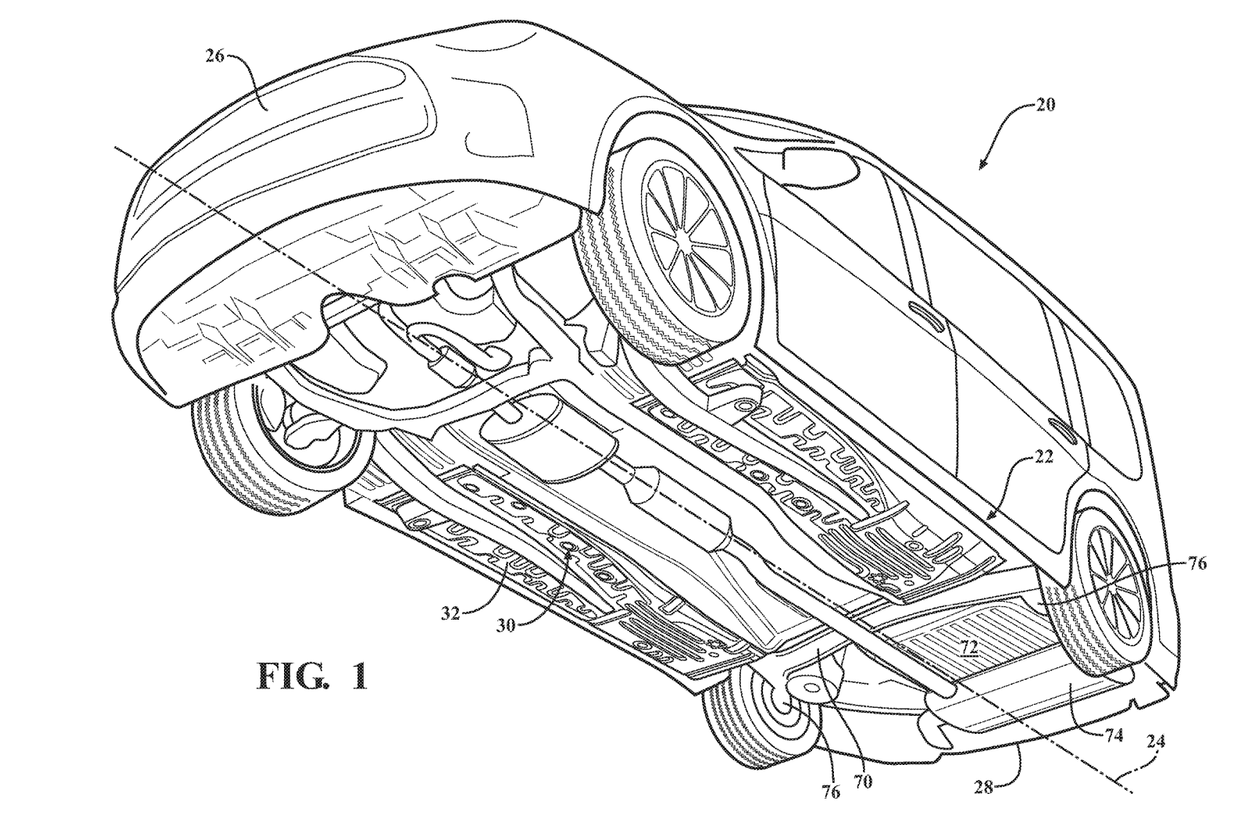
FIG. 1 is a schematic perspective view of a vehicle from an underside of the vehicle.
Figure 2:
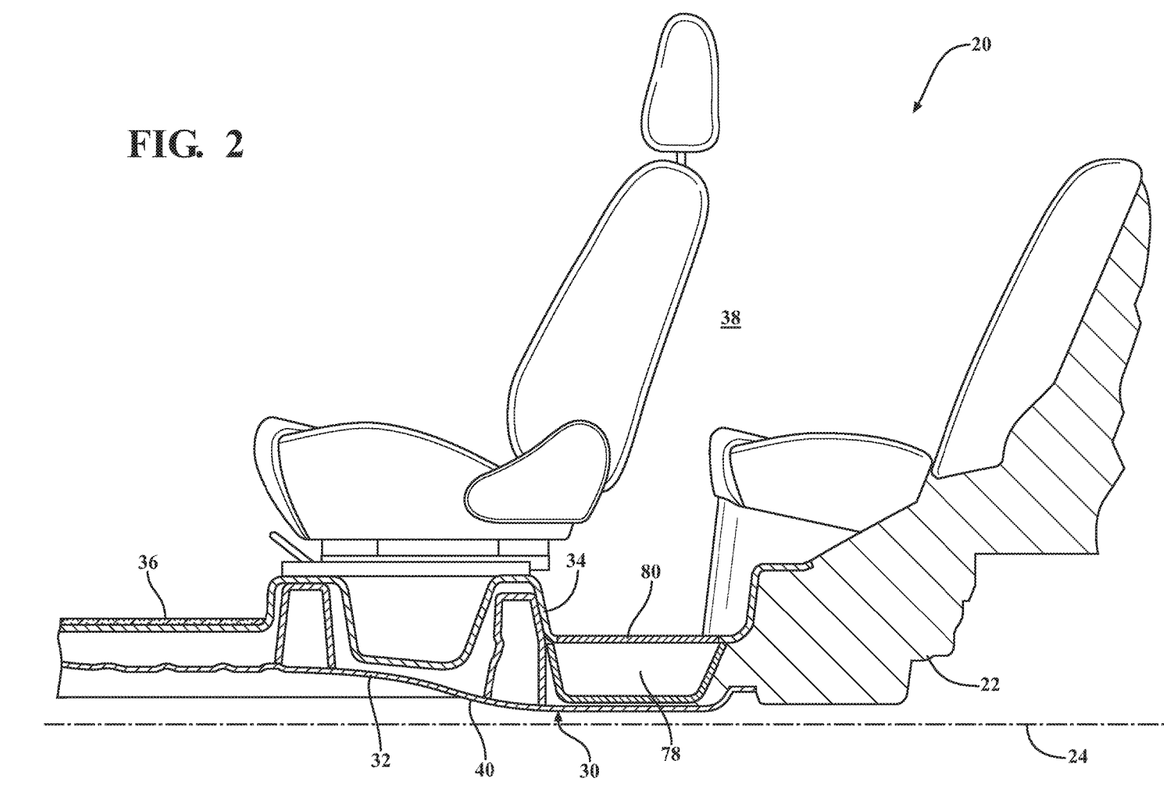
FIG. 2 is a schematic cross sectional view of the vehicle.

Referring to Figures FIGS. 1 and 2, the vehicle 20 includes a frame system 22, which extends along a longitudinal axis 24 between a forward end 26 and a rearward end 28. The forward end 26 is associated with a front of the vehicle 20 along the longitudinal axis 24, whereas the rearward end 28 is associated with the back of the vehicle 20 along the longitudinal axis 24. The frame system 22 may include any support structure that supports the various components of the vehicle 20. For example, the frame system 22 may include, but is not limited to, a body on frame system 22, or a uni-body system. The frame system 22 supports the different body panels, the powertrain, the steering components, etc. The specific type and/or configuration of the frame system 22 is not pertinent to the teachings of this disclosure, and are therefore not described in detail herein.

The frame system 22 includes and/or supports a floor pan 30. As such, the floor pan 30 is attached to one or more components of the frame system 22, such as but not limited to a frame rail, support member, cross beam, etc. Alternatively, if the frame system 22 is a uni-body system, then the floor pan 30 is incorporated into and part of the frame system 22. The floor pan 30 may include a large formed sheet, often formed from a metal stamping, that may incorporate several smaller stampings to form at least part of a floor 34 of the vehicle 20.

Referring to FIG. 2, the floor pan 30 includes a mid-body portion 32. The mid-body portion 32 of the floor pan 30 at least partially provides a floor 34 for a passenger compartment 38 of the vehicle 20. It should be appreciated that a floor liner 36 may be disposed against the mid-body portion 32, within an interior passenger compartment 38 of the vehicle 20. Accordingly, the mid-body portion 32 of the floor pan 30 is operable to support a load that may be applied to the floor pan 30 from within the passenger compartment 38. Additionally, the mid-body portion 32 of the floor pan 30 at least partially defines a lower exterior surface 40 of the floor pan 30. It should be appreciated that the floor pan 30, including the mid-body portion 32, is not an aero panel attached to the floor pan 30 for improving aerodynamics, but is rather part of the floor pan 30, and forms a structural load bearing component of the floor pan 30.

Figure 3:
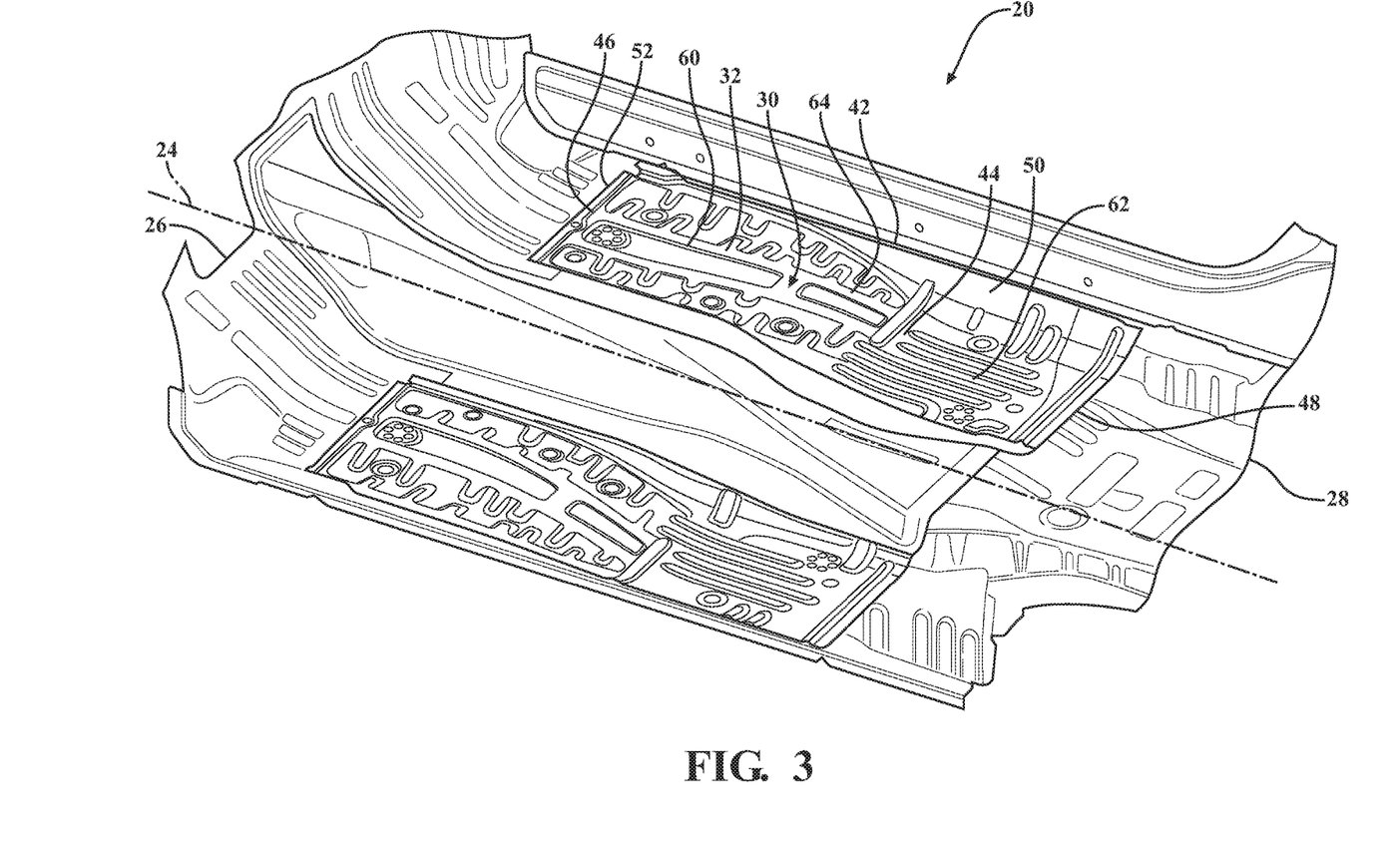
FIG. 3 is a schematic perspective view of a floor pan of the vehicle from the underside of the vehicle.
Figure 4:
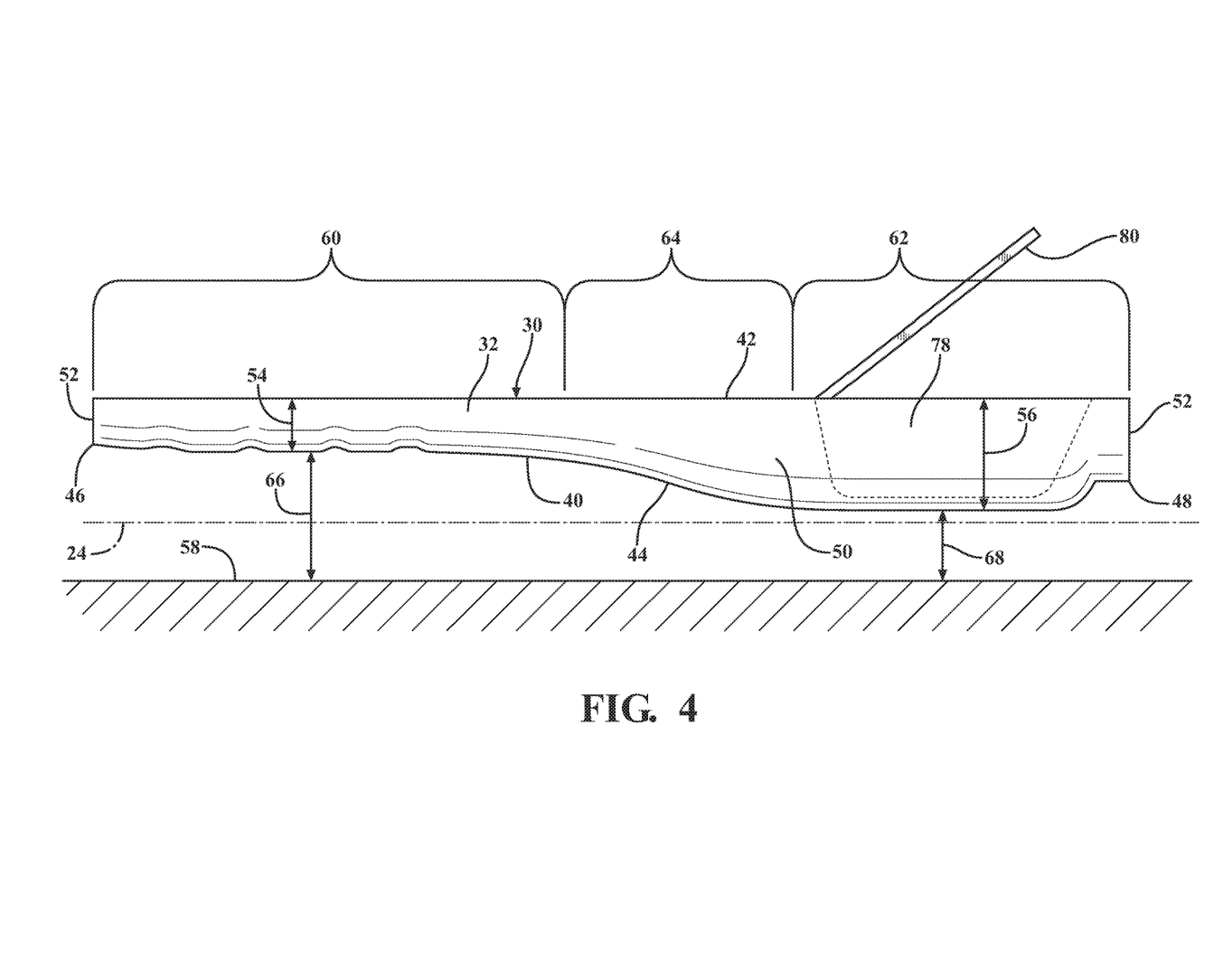
FIG. 4 is a schematic side view of a mid-body portion of the floor pan.

Referring to FIGS. 3 and 4, the mid-body portion 32 includes a top edge 42, and a bottom wall 44. The bottom wall 44 includes a first end 46 and a second end 48. The first end 46 and the second end 48 are spaced from each other along the longitudinal axis 24. The first end 46 of the bottom wall 44 is disposed nearer the forward end 26 of the frame system 22 than the second end 48, and may be referred to as the forward end of the bottom wall 44. The second end 48 of the bottom wall 44 is disposed nearer the rearward end 28 of the frame system 22 than the first end 46, and may be referred to as the rearward end of the bottom wall 44. The top edge 42 of the mid-body portion 32 is generally disposed along or adjacent the floor 34 of the interior passenger compartment 38 of the vehicle 20. The mid-body portion 32 may further include one or more side walls 50 and one or more end walls 52, which extend between and connect the top edge 42 and the bottom wall 44.

Referring to FIG. 4, the mid-body portion 32 defines a depth between the top edge 42 and the bottom wall 44. The depth at the first end 46 of the bottom wall 44 has a first value 54, i.e., a first depth 54. The depth at the second end 48 of the bottom wall 44 has a second value 56, i.e., a second depth 56. The second value 56 of the depth is greater than the first value 54 of the depth to position the second end 48 of the bottom wall 44 at a lower elevation than the first end 46 of the bottom wall 44 relative to a reference plane 58. The reference plane 58 may include any planar surface, such as but not limited to a ground surface or a road surface. Accordingly, the depth of the mid-body portion 32 adjacent the second end 48 of the bottom wall 44, i.e., the second depth 56, is greater than the depth of the mid-body portion 32 adjacent the first end 46 of the bottom wall 44, i.e., the first depth 54.

The depth of the mid-body portion 32 may change gradually, between the first end 46 and the second end 48 of the bottom wall 44, with a change in position along the longitudinal axis 24. However, it should be appreciated that the change in depth of the mid-body portion 32, along the longitudinal axis 24, need not be consistent. For example, such as shown in the exemplary embodiment shown in the FIGS., the mid-body portion 32 may include a first section 60 that is generally disposed at the first value 54 of the depth, and a second section 62 that is generally disposed at the second value 56 of the depth. The mid-body portion 32 may further include a transition section 64, which extends along the longitudinal axis 24 between the first section 60 and the second section 62. The transition section 64 transitions the bottom wall 44 of the mid-body portion 32 between the first value 54 of the depth and the second value 56 of the depth.

The first value 54 of the depth of the mid-body portion 32, at the first end 46 of the bottom wall 44, presents the bottom wall 44 at a first height 66 relative to the reference plane 58. Therefore, the mid-body portion 32 of the floor pan 30 is spaced above the reference plane 58 the first height 66 at the first end 46 of the bottom wall 44. The second value 56 of the depth of the mid-body portion 32, at the second end 48 of the bottom wall 44, presents the bottom wall 44 at a second height 68 relative to the reference plane 58. Therefore, the mid-body portion 32 of the floor pan 30 is spaced above the reference plane 58 the second height 68 at the second end 48 of the bottom wall 44. The second height 68 is less than the first height 66 to position the second end 48 of the bottom wall 44 nearer the reference plane 58 than the first end 46 of the bottom wall 44. As noted above, the reference plane 58 may include the ground surface. As such, the second end 48, i.e., the rearward end of the bottom wall 44, is disposed nearer to the reference plane 58, i.e., the ground surface, than is the first end 46, i.e., the forward end of the bottom wall 44.

Referring to FIG. 1, because the second end 48 of the bottom wall 44 is positioned nearer to the reference plane 58, e.g., the ground surface, than the first end 46 of the bottom wall 44, the mid-body portion 32 of the floor pan 30 is operable to direct a flow of air downward toward the ground surface. Therefore, the shape of the mid-body portion 32 is operable to direct the flow of air underneath one or more low hanging components of the vehicle 20 that may be disposed rearward of the mid-body portion 32 of the floor pan 30, along the longitudinal axis 24. For example, the vehicle 20 may include such low hanging components as a rear axle 70, a fuel tank 72, suspension components 76, one or more exhaust system pipes, or a muffler 74, which hang down below the vehicle 20. The second end 48 of the bottom wall 44 is positioned nearer the ground surface to deflect or re-direct the flow of air underneath these low hanging components, thereby reducing aerodynamic drag on the vehicle 20.

Referring to FIGS. 2 and 4, because the second section 62 of the mid-body portion 32 is spaced from the top edge 42 of the mid-body portion 32 the second value 56 of the depth, the mid-body portion 32 forms a tub having a significant volume. This tub space may be utilized as a storage compartment 78. As such, the storage compartment 78 extends between the top edge 42 of the mid-body portion 32 and the bottom wall 44 of the mid-body portion 32, and is located adjacent the second end 48 of the bottom wall 44. The storage compartment 78 may be accessed from within the passenger compartment 38 of the vehicle 20.

Referring to FIGS. 2 and 4, the vehicle 20 may further include a cover 80 that is operable to cover 80 the storage compartment 78. The cover 80 may be moveable between a closed position concealing the storage compartment 78, and an open position, providing access to the storage compartment 78. The cover 80 may be attached to the floor pan 30 in any suitable manner. Additionally, the cover 80 may be configured to move between the open position and the closed position in any suitable manner. Accordingly, the mid-body portion 32 of the floor pan 30 not only improves the aerodynamics of the vehicle 20 by redirecting the flow of air underneath low hanging components of the vehicle 20, but also provides additional storage space for the vehicle 20.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. A vehicle comprising:
a frame system extending along a longitudinal axis between a forward end and a rearward end;
a floor pan attached to the frame system, and including a mid-body portion having a bottom wall having a first end and a second end spaced from each other along the longitudinal axis, with the first end disposed nearer the forward end of the frame system than the second end, and with the second end disposed nearer the rearward end of the frame system than the first end; and
wherein the mid-body portion of the floor pan is spaced above a reference plane a first height at the first end of the bottom wall, and wherein the mid-body portion of the floor pan is spaced above the reference plane a second height at the second end of the bottom wall, with the second height being less than the first height to position the second end of the bottom wall nearer the reference plane than the first end of the bottom wall.

2. The vehicle set forth in claim 1, wherein the mid-body portion includes a top edge, and defines a depth between the top edge and the bottom wall, with the depth of the mid-body portion at the first end of the bottom wall presenting the bottom wall at the first height relative to the reference plane, and with the depth of the mid-body portion at the second end of the bottom wall presenting the bottom wall at the second height relative to the reference plane, wherein the reference plane is a road surface.

3. The vehicle set forth in claim 2, wherein the depth of the mid-body portion changes gradually, between the first end and the second end of the bottom wall, with a change in position along the longitudinal axis.

4. The vehicle set forth in claim 2, wherein the depth of the mid-body portion adjacent the second end of the bottom wall is greater than the depth of the mid-body portion adjacent the first end of the bottom wall.

5. The vehicle set forth in claim 1, wherein the mid-body portion of the floor pan forms a storage compartment between the top edge of the mid-body portion and the bottom wall of the mid-body portion, adjacent the second end of the bottom wall.

6. The vehicle set forth in claim 5, further comprising a cover operable to cover the storage compartment.

7. The vehicle set forth in claim 1, wherein the mid-body portion of the floor pan at least partially provides a floor for a passenger compartment.

8. The vehicle set forth in claim 1, wherein the mid-body portion of the floor pan at least partially defines a lower exterior surface of the floor pan.

9. The vehicle set forth in claim 1, wherein the mid-body portion of the floor pan is operable to direct a flow of air underneath a component disposed rearward of the mid-body portion of the floor pan along the longitudinal axis.

10. The vehicle set forth in claim 1, wherein the mid-body portion of the floor pan is operable to support a load applied to the floor pan from within a passenger compartment.

11. The vehicle set forth in claim 1, wherein the mid-body portion includes a first section generally disposed at the first height relative to the reference plane, and a second section generally disposed at the second height relative to the reference plane, and a transition section extending between the first section and the second section and transitioning the bottom wall of the mid-body portion between the first height and the second height relative to the reference plane.

12. A floor pan for a vehicle, the floor pan comprising:
a mid-body portion having a top edge and a bottom wall, with the bottom wall having a forward end and a rearward end spaced from each other along a longitudinal axis;
wherein the mid-body portion defines a depth between the top edge and the bottom wall, with the depth at the forward end of the bottom wall having a first value, and the depth at the rearward end of the bottom wall having a second value, wherein the second value is greater than the first value to position the rearward end of the bottom wall at a lower elevation than the forward end of the bottom wall relative to a reference plane.

13. The floor pan set forth in claim 12, wherein the depth of the mid-body portion changes gradually, between the forward end and the rearward end of the bottom wall, with a change in position along the longitudinal axis.

14. The floor pan set forth in claim 12, wherein the mid-body portion forms a storage compartment between the top edge of the mid-body portion and the bottom wall of the mid-body portion, adjacent the rearward end of the bottom wall.

15. The floor pan set forth in claim 14, further comprising a cover operable to cover the storage compartment.

16. The floor pan set forth in claim 12, wherein the mid-body portion at least partially defines a lower exterior surface.

17. The floor pan set forth in claim 12, wherein the mid-body portion includes a first section generally disposed at the first value of the depth, and a second section generally disposed at the second value of the depth, and a transition section extending between the first section and the second section and transitioning the bottom wall of the mid-body portion between the first value of the depth and the second value of the depth.

* * * * *

UNITED STATES PATENT AND TRADEMARK OFFICE
CERTIFICATE OF CORRECTION

PATENT NO. : 10,040,494 B2  
APPLICATION NO. : 15/398744  
DATED : August 7, 2018  
INVENTOR(S) : Steven A. Del Gaizo et al.

Page 1 of 1

It is certified that error appears in the above-identified patent and that said Letters Patent is hereby corrected as shown below:

On the Title Page

Item (72) Inventors: Add --Andrew W. White, Shelby Township, MI (US)--

Signed and Sealed this  
Third Day of March, 2020

Andrei Iancu  
*Director of the United States Patent and Trademark Office*